United States Patent [19]
Viertel et al.

[11] Patent Number: 5,510,791
[45] Date of Patent: Apr. 23, 1996

[54] REMOTE CONTROL UNIT FOR INSTALLATION IN VEHICLE

[75] Inventors: Lothar Viertel, Altforweiler; Karl-Heinz Pompino, Wuppertal, both of Germany; Patrick Welter, LaChambre; Didier Cauchois, Guerting, both of France

[73] Assignee: Gebr. Happich GmbH, Germany

[21] Appl. No.: 267,817

[22] Filed: Jun. 28, 1994

[51] Int. Cl.$^6$ .................................................. G08C 17/00
[52] U.S. Cl. ..................... 341/173; 341/176; 340/825.72; 455/9; 455/345
[58] Field of Search ..................... 341/176, 173; 340/825.69, 825.72; 455/92, 99, 345

[56]  References Cited

U.S. PATENT DOCUMENTS

| | | | |
|---|---|---|---|
| 4,241,870 | 12/1980 | Marcus | 455/99 |
| 4,247,850 | 1/1981 | Marcus | 341/176 |
| 4,546,551 | 10/1985 | Franks | 364/559 |
| 4,595,228 | 6/1986 | Chu | 296/37.7 |

Primary Examiner—Brent A. Swarthout
Assistant Examiner—Daniel J. Wu
Attorney, Agent, or Firm—Ostrolenk, Faber, Gerb & Soffen

[57]  ABSTRACT

A remote control unit for controlling a plurality of automatic devices for opening and closing a plurality of garage doors, parking garage gates, private residence fences, and the like is located on the ceiling of a vehicle at the sun visor. The remote control unit has switches for activating each of the plurality of automatic opening and closing devices. The remote control unit may be accommodated in a recess formed in the vehicle ceiling or in a recess formed in the visor connected to the vehicle ceiling when the visor is in its non-use position. Alternatively, the remote control unit may be shaped so as to correspond to a shape of a portion of the visor and be attached to the vehicle ceiling so that the remote control unit surrounds a periphery of the visor portion. In addition, the remote control unit may be formed integrally with or adapted to receive a visor support bracket which is attached to the vehicle ceiling. The remote control unit may be powered by the vehicle electric system or by a battery. The unit transmits radio signals to receivers contained in the automatic devices.

18 Claims, 4 Drawing Sheets

5,510,791

REMOTE CONTROL UNIT FOR INSTALLATION IN VEHICLE

BACKGROUND OF THE INVENTION

The present invention relates to a remote control unit for use in a motor vehicle and more particularly, to a remote control unit which is mountable in the vehicle, is operable by means located off the vehicle sun visor and is adapted to remotely activate a plurality of automatic devices, e.g. for opening and closing a plurality of garage doors, parking garage gates, private residence fences, etc. from inside the vehicle.

A conventional remote control unit for activating an automatic device comprises a portable activator including a battery powered transmitter for activating a single automatic device, like a door, gate or fence. The transmitter is either powered by its own internally housed low voltage battery or it may be connected to the vehicle electric power circuit. The portable activator is contained within a housing and may be mounted somewhere in the vehicle. The portable activator is often mounted on a sun visor by a clip provided on the activator housing for removably attaching the activator to the sun visor of a vehicle.

However, such a portable activator is easily removed or misplaced or even stolen from a vehicle, in the latter case providing an unauthorized person access to a home or parking garage. In addition, if the activator is not permanently positioned for use, then before the activator can be used, it must be removed from its storage location, such as the visor or glove compartment. After use, the activator must be returned to its storage location. Further, if more than one automatic device, like a garage door, parking gate or private residence fence, is to be operated from a single vehicle, a separate portable activator for each automatic device is typically provided and stored in the vehicle. This multiplies the above problems and adds a problem of determining which activator is to be used with each automatic device.

Another conventional vehicle garage door activator is described in U.S. Pat. No. 4,247,850 in which an operator controlled radio transmitter for activating only a single door, gate or fence is mounted on a visor of the vehicle. The activator includes an electric circuit for controlling the transmitter, an LED for indicating operation of the circuit and a switch for activating the circuit. The switch and LED are mounted on a frame of a vanity mirror provided on the visor. Perhaps the switch may be located elsewhere on the visor body, either on the surface that is exposed when the visor is lowered into its position of use or upraised when it is out of use. Also, as is conventional, the visor is pivotally attached to the vehicle ceiling to allow a vehicle occupant to rotatably adjust the orientation of the visor.

When a vehicle occupant activates the switch of the activator, the visor on which the switch is supported is rotated away from the driver making, it difficult for the driver to operate the switch, especially using only one hand. The driver could hold the visor steady with one hand and activate the switch with the other hand, which is impossible with a moving vehicle, or the occupant will have to restore the visor to its previous position after operating the switch. Further, the weight of the vanity mirror, the activator switch, LED and the activator circuitry and transmitter added to the visor may require sturdier and consequently more expensive visor mounting brackets.

Furthermore, the activator shown in the '850 patent can only be used to activate one automatic device. Thus, if a driver needs to operate an additional device, additional visor mounted activators are required. In addition, if a driver changes the door, gate or fence the vehicle is to pass, the entire visor assembly might have to be replaced with a new visor having a corresponding activator or the visor would have to be disassembled to change the activator.

SUMMARY OF THE INVENTION

It is an object of the present invention to provide a remote control activator mounted in a vehicle that overcomes the above noted problems with conventional remote control units.

It is also an object of the present invention to provide a remote control unit for remotely controlling a plurality of automatic devices e.g., for opening and closing gates, doors, and fences from within a vehicle.

It is a further object of the present invention to provide such a universal remote control unit that is easily actuated.

It is also an object of the present invention to provide a universal remote control unit that can be easily and removably mounted in a vehicle.

It is another object of the present invention to provide such a unit that can be reprogrammed to control a different gate, door or fence.

The remote control unit of the present invention includes a housing in which the components of the unit are disposed. The housing receives a visor support bracket which holds one end of the body of an automotive vehicle sun visor. The visor support bracket is fixedly attached via a base plate to the ceiling inside the vehicle, typically over the windshield. This secures the housing containing the remote control unit to the vehicle ceiling.

The remote control unit may be powered by its own battery power supply but is preferably powered by the vehicle electric circuit and battery. The remote control unit is connected to electrical leads running from the vehicle electric power circuit through a hole formed in the vehicle ceiling. The electrical leads are connected to contacts mounted on the base plate at the ceiling. The contacts disposed on the base plate are connected to contacts which are connected to or disposed within the remote control unit to supply electrical power to the remote control unit. Alternatively, the remote control unit may be powered by an easily replaceable, low voltage battery that is separate from the vehicle battery.

The remote control unit has a plurality of switches, preferably operated by switch buttons which protrude through openings formed in the housing. Each button or a sequence of buttons can be depressed by a vehicle occupant to remotely control the operation of one of a plurality of different automatic devices. Also, the housing has an opening for a plug connection for a learning capable or programmable device which can be inserted if a different automatic device is to be operated by the remote control unit. The remote control unit of the present invention is thus able to control several different automatic devices from a single remote control unit. Also, the remote control unit can be modified quickly and easily to incorporate a new automatic device to be controlled.

The housing also includes an opening for allowing an indicator, such as an LED, to protrude therethrough for indicating that one of the buttons has been depressed and the switch successfully activated.

The electrical components of the remote control unit may preferably be disposed within the housing. They may include a radio transmitter, a printed circuit having a microprocessor for controlling the radio transmitter and an antenna attached to the transmitter. As mentioned above, the housing may also include electrical contacts for engaging the electric lead contacts protruding through the hole in the vehicle ceiling for supplying electrical power to the printed circuit. The contacts disposed within the housing are automatically connected to the contacts protruding through the vehicle ceiling when the visor holder and housing are attached to the ceiling.

To allow the outwardly facing surface of a sun visor to be flush with the adjacent vehicle ceiling when the visor is in its upraised, non-use position, the visor can be provided with a recess shaped to the housing of the remote control unit in order to receive the housing with the visor positioned fully in the non-use position at the vehicle ceiling. Alternatively, a recess may be formed in the vehicle ceiling for receiving the remote control unit with the visor in the non-use position.

In another embodiment, the remote control unit housing is shaped to protrude beyond a portion of the periphery of a visor so that the remote control unit housing and particularly the switch buttons are disposed next to the visor when the visor is in its non-use position. This embodiment eliminates the need for an operator of the remote control unit to move the visor to an open or use position to be able operate the switch buttons on the remote control unit.

In a further embodiment, a ceiling plate may be provided and mounted on the vehicle ceiling at the windshield. The ceiling plate may include a mounting assembly for attaching the ceiling plate to the vehicle ceiling. The ceiling plate preferably has a visor, visor support brackets and a remote control unit mounted on it.

An advantage of the present invention is the mounting of the entire remote control unit or at least the control switches or buttons on the ceiling of a vehicle. This allows the remote control unit to be hidden from view when the visor is in the non-use position against the ceiling. More important, it allows a user to easily push the switch buttons with one hand and without having to stop a vehicle and without the risk that the visor might swing as the switch buttons are operated. Thus, when a user presses on one of the buttons, there is no movement of the visor or the remote control unit as occurs with conventional devices.

In addition, the remote control unit of the invention is secured to the vehicle which eliminates the possibility that it can be misplaced and reduces the ease of theft. Also, the remote control unit can be easily installed and a completely new remote control unit can be installed without having to replace the visor.

The switches may be operated by toggle type switches or slide switches, or by depressible buttons or may be non-movable contact pad switches which are operated without movement upon finger contact.

Other features and advantages of the present invention will become apparent from the following description of the invention which refers to the accompanying drawings.

DETAILED DESCRIPTION OF THE PREFERRED EMBODIMENTS

Figure 1:
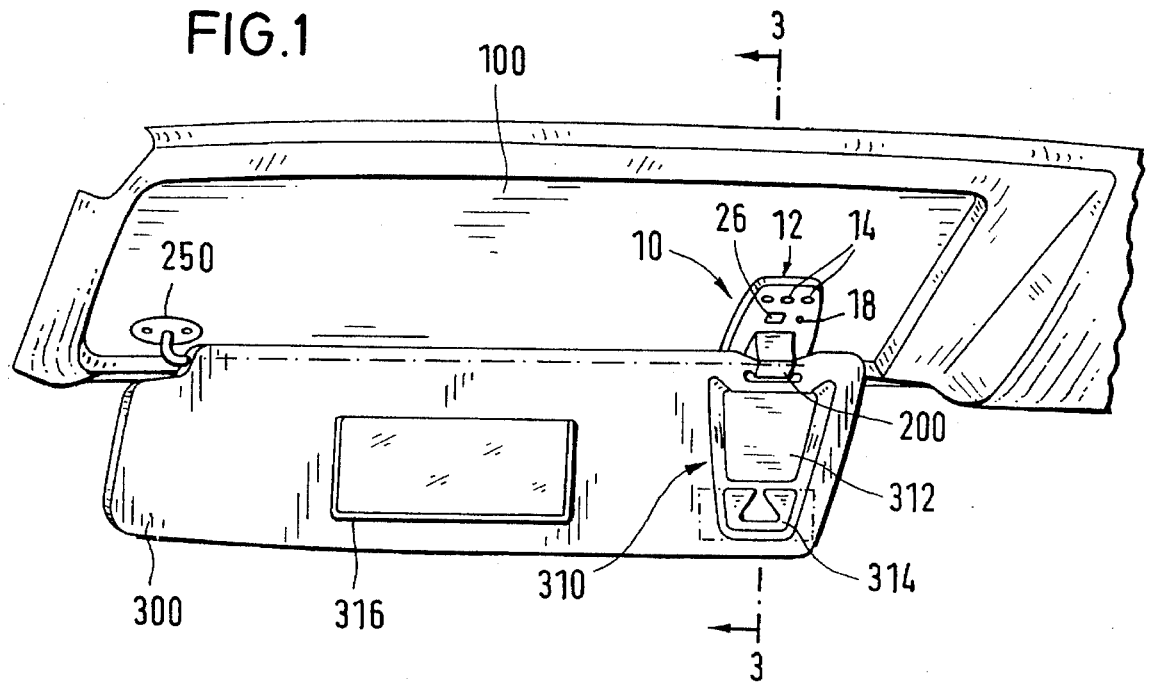
FIG. 1 is a schematic view of a first embodiment of the invention.
Figure 2:
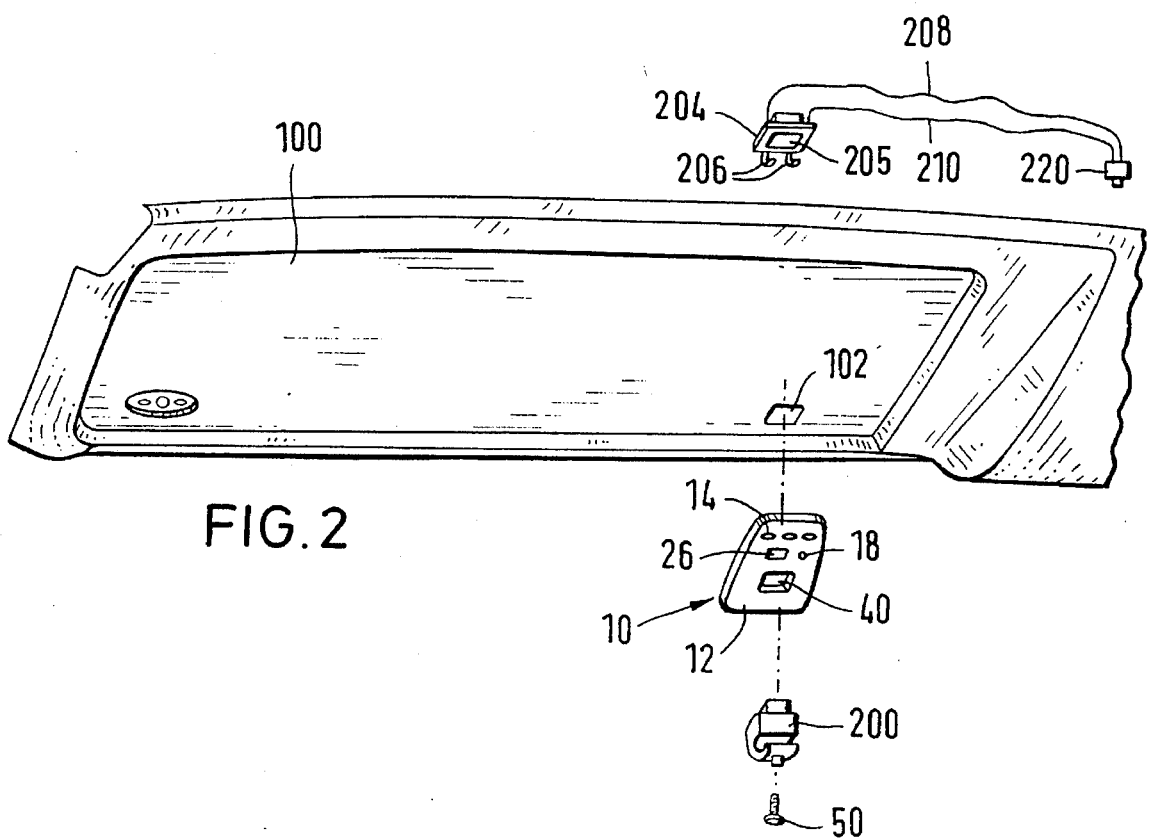
FIG. 2 is an exploded schematic view of the embodiment shown in FIG. 1.
Figure 3:
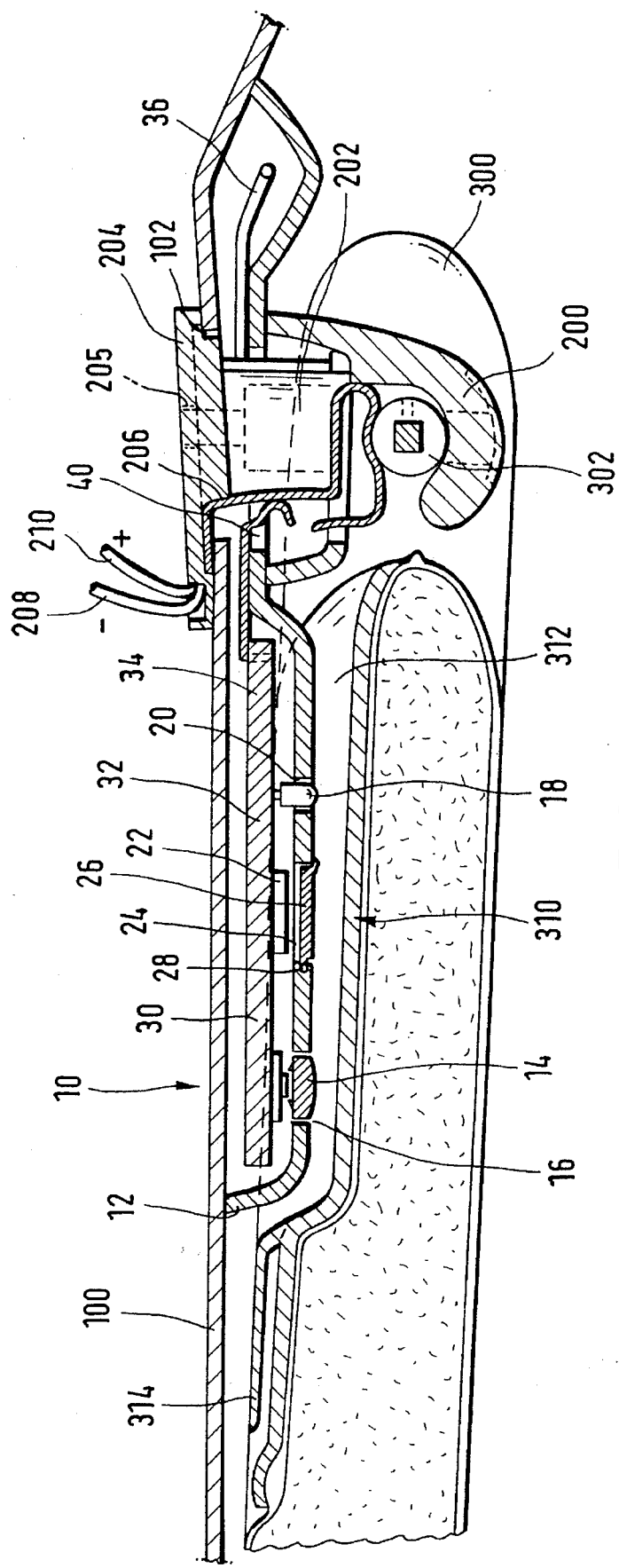
FIG. 3 is a cross-sectional view of the embodiment shown in FIG. 1 through the remote control unit along the line 3—3.

In the Figures, like reference numerals indicate like elements. A first embodiment of a remote control unit 10 of the invention is shown in FIGS. 1–3. The remote control unit 10 is disposed within a housing 12 which is attached to a ceiling 100 of a vehicle (not shown) over the windshield, as described below.

Alternatively, the part of the ceiling 100 shown in FIG. 1 may be formed as a separate ceiling plate to be mounted on the vehicle ceiling. Such a ceiling plate may be molded of plastic or formed of any other suitable material and includes a recess generally complementary in shape to the surface and contours of the visor 300 and the elements on the visor surface which face the inside of the recess with the visor upraised in its non-use position. The ceiling plate preferably includes the structural elements shown in FIGS. 1–3 mounted thereon. A ceiling plate would be attached to a vehicle ceiling in known manner and may be covered by the covering layer over the ceiling.

The remote control unit 10 includes a plurality of switch buttons 14 or non-movable switch pad contacts, or the like, which protrude through or are accessible at a plurality of access holes 16 formed in the housing 12. The buttons 14 are operable for activating several different automatic devices, like gate, door, etc. opening devices. Although three buttons 14 are shown in FIG. 1, the number of buttons 14 provided in the remote control unit 10 can be selected according to the number of automatic devices to be controlled by the remote control unit 10, e.g. one button per device or a button pressing sequence pattern for each device. The particulars of the automatic operation of buttons for transmitting a signal by the unit 10 is not critical to this invention.

The remote control unit 10 also includes an indicator 18 which protrudes through a hole 20 formed in the housing 12. The indicator 18 may be operable to notify a user that one button 14 has been operated or that the remote control unit 10 is transmitting a signal. The indicator 18 may preferably include a light emitting diode (LED) or other visible indicator. The indicator 18 may emit an audible signal in addition to or in place of the visible signal.

Also disposed within the housing 12 is a multi-plug connector 22 that is programmable and easily replaceable. The multi-plug connector 22 is inserted through a hole 24 formed in the housing and is attached to a printed circuit. The multi-plug connector 22 is easily removed and replaced on the printed circuit. As is known in the programming art, the multi-plug connector can be programmed to control any door opener or other transmitted signal responsive automatic device. A cover 26 is attached to the housing 12 for covering the hole 24. The cover 26 is easily removed and can be attached by press fitting or providing the cover 26 with a projection 28 for engaging with an accommodating recess formed in the housing 12.

A printed circuit board 30 is mounted within the housing 12. The printed circuit board 30 includes a microprocessor 32 for controlling a radio transmitter 34 also mounted within the housing 12. The radio transmitter 34 is connected to an antenna 36 for transmitting radio signals.

A hole 40 formed through the remote control unit housing 12 is shaped to receive a sun visor outer support bracket 200 which is attached to the ceiling 100 of the vehicle. A main visor support bracket 250 is also provided at the opposite end of the visor 300 from the bracket 200. The support bracket 200 has a dome 202 for fitting in the hole 40 formed in the housing 12 and in the corresponding hole 102 formed in the ceiling 100.

The support bracket 200 is connected to a mounting plate 204 disposed on the other side or inside of the ceiling 100. The mounting plate 204 has a hole 205 formed in it for receiving the dome 202 and a screw 50 which attaches the support bracket 200 to the mounting plate 204. The mounting plate 204 also carries a plurality of electric contacts 206 thereto for engaging contacts in the remote control unit 10. The contacts 206 are connected at one end via standard vehicle electric circuit electrical wires 208, 210 to a battery 220 of the vehicle. At the other end, the contacts 206 are connected to the printed circuit 30 in machinery 12. Thus, the remote control unit 10 is constantly electrically powered.

If no electric contacts 206 are provided in a vehicle ceiling, the remote control unit 10 can be powered by a portable electric battery which is removably mounted in the remote control unit 10.

A sun visor 300 is attached to the ceiling 100 via the two visor support brackets 200 and 250. An outer support rod 302 mounted along the edge of the visor 300 is received within the visor outer support bracket 200 to rotatably secure the visor 300 to the ceiling 100.

The visor 300 is preferably formed with a remote control unit receiver 310 including a recess shaped complementary to and for accommodating the remote control unit 10. This arrangement is useful with a normal profile ceiling plate 100, profiled for a sun visor, because the space for accommodating the remote control unit is provided by forming the receiver 310 in the visor body. The receiver 310 also includes a frame 312 which may include a ticket holder clip 314 for holding a parking garage ticket, or the like. The visor 300 may also include a vanity mirror 316 which may include a light powered by the vehicle battery, as is conventional.

The remote control unit 10 is installed as follows. The visor support bracket 200 is inserted into the hole 40 in the housing 12. A screw 50 is inserted into a hole (not shown) in the support bracket 200, the hole 102 in the ceiling 100 and the hole 205 in the mounting plate 204. The mounting plate hole 205 preferably has a threaded nut portion to engage the screw 50. Any number of screws 50 can be used to attach the visor support bracket 200 and the remote control unit 10 to the ceiling 100. Also, the screws 50 can be inserted into holes (not shown) formed in the housing 12, if desired.

Figure 4:
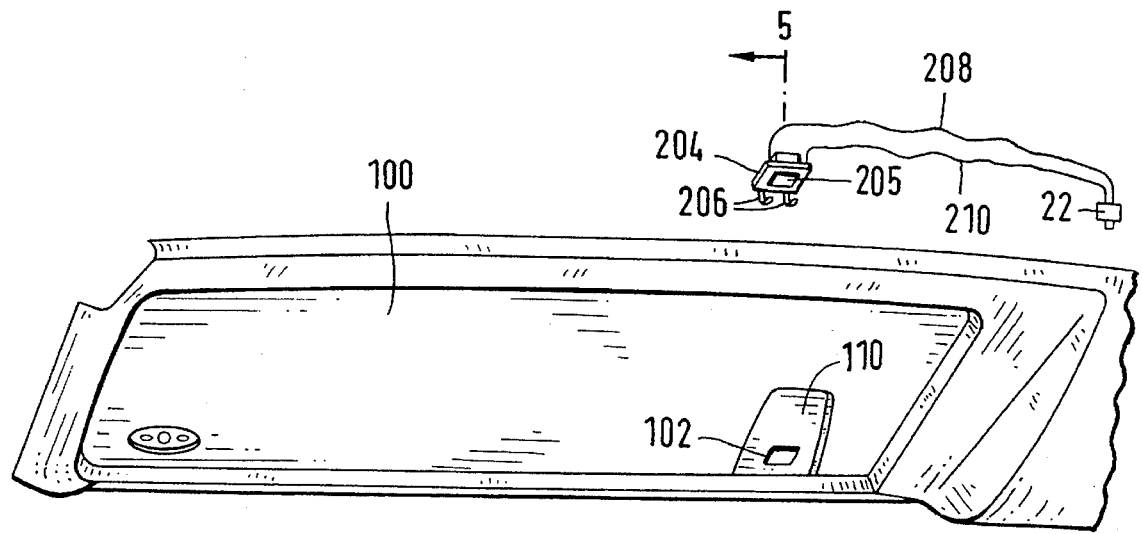
FIG. 4 is an exploded schematic view of a second embodiment of the invention.
Figure 5:
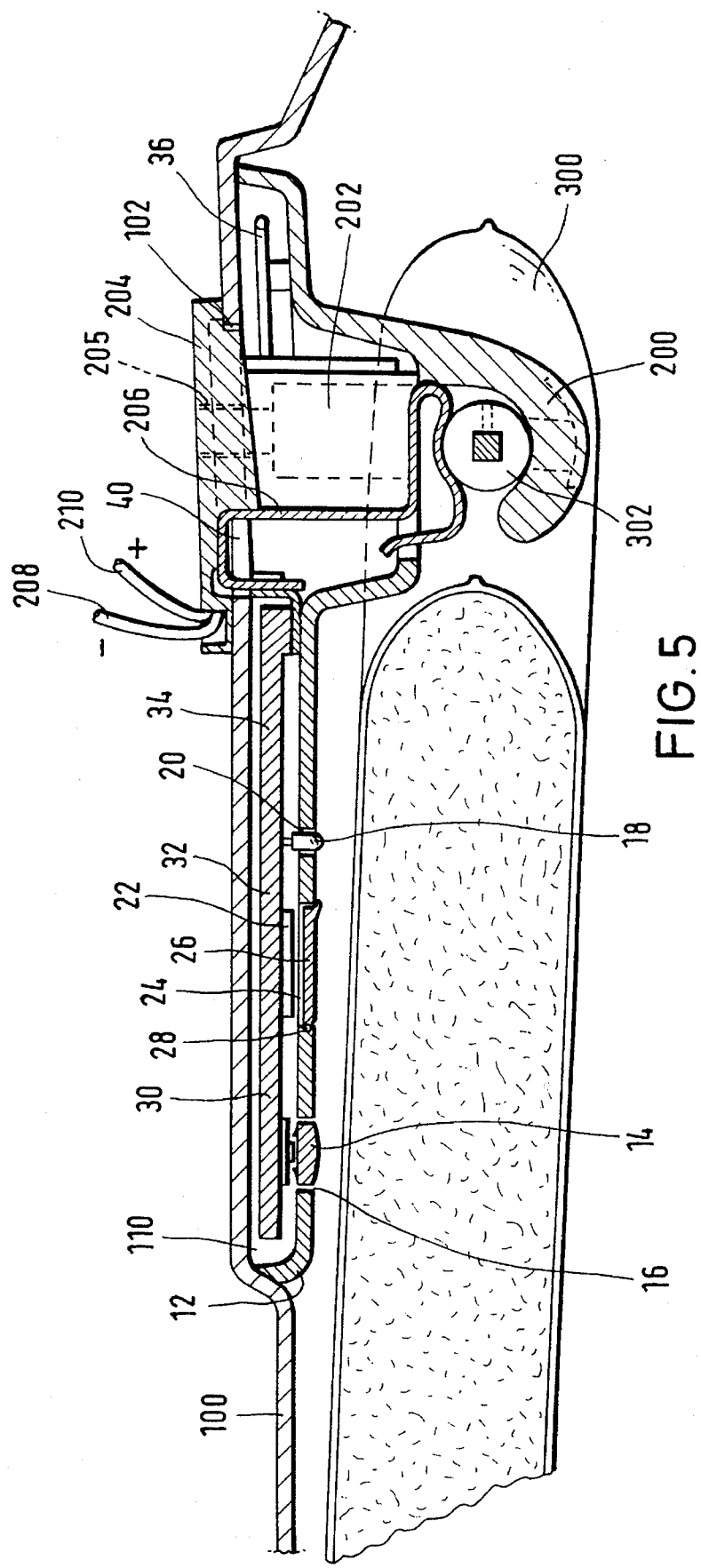
FIG. 5 is a cross-sectional view of the embodiment shown in FIG. 4 through the remote control unit along the line 5—5.

In an alternative embodiment shown in FIGS. 4 and 5, the remote control unit housing 12 and the visor mounting outer support bracket 200 are formed as a single unit. The combined remote control unit 10 and bracket 200 are attached by inserting a screw 50 into at least one hole (not shown) formed in the combined assembly and into the hole 205 formed in the mounting bracket 204.

Also in the embodiment shown in FIGS. 4 and 5, the ceiling 100 is specifically profiled with a recess 110 complementary to for accommodating the remote control unit 10. The remote control unit 10 is mounted in the recess 110 just like the unit 10 described in the first embodiment is attached to the ceiling 100. The recess 110 in the ceiling enables the remote control unit 10 to be mounted flush with the ceiling 100 and therefore, the remote control unit receiver 310 provided on the visor 300 in the first embodiment is unnecessary.

Figure 6:
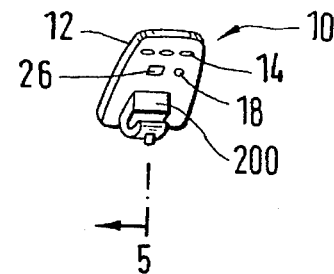
FIG. 6 is a schematic view of a third embodiment of the invention.
Figure 6:
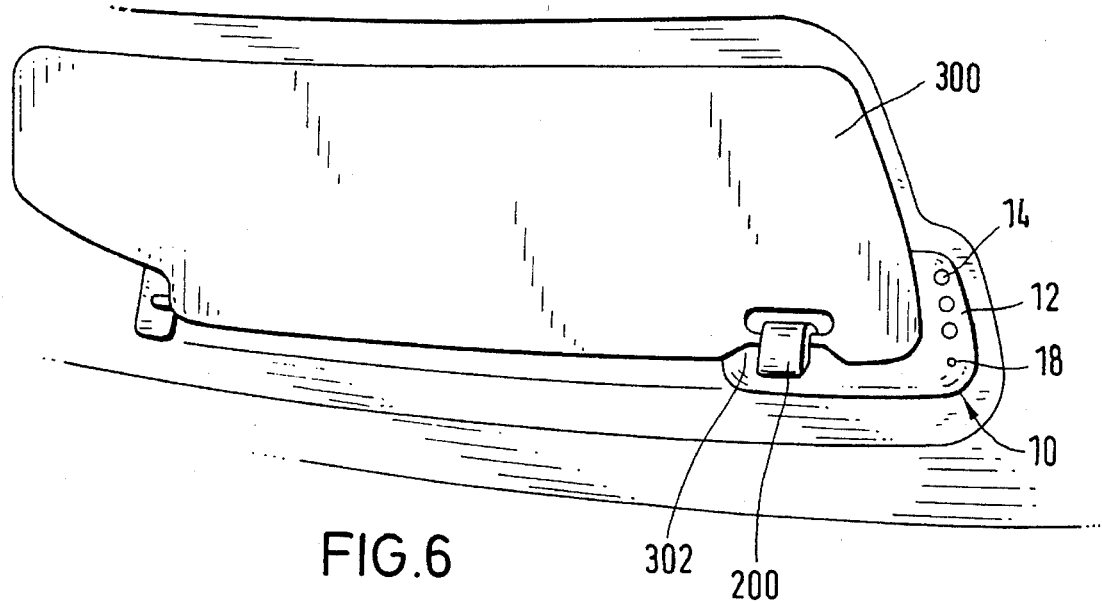

In another embodiment shown in FIG. 6, the operating buttons 14 of the remote control unit 10 and part of the housing 12 are mounted outside the periphery of the visor 300. The housing 12 has a generally L-shape for cooperating with the shape of the visor 300. More specifically, the L-shaped housing 12 fits around a periphery of an end portion of the visor 300.

The housing 12 can be connected to the vehicle ceiling 100 by inserting a visor support bracket 200 into a hole formed in the housing 12 as in the first embodiment. Also, the visor support bracket 200 and housing 12 can be formed as one unit as in the second embodiment. Because of the shape of the housing 12, other fasteners such as screws 50 should be used at an end of the housing 12 that is remote from the location of the visor support bracket 200.

In the embodiment shown in FIG. 6, the occupant of the vehicle does not have to move the visor 300 to gain access to operate one of the buttons 14. Instead, the housing 12 and buttons 14 are so shaped and/or mounted on the ceiling 100 so as to allow the user easy access to the remote control unit 10.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A remote control unit for use in a vehicle for controlling an automatic device outside the vehicle, the vehicle having a ceiling and having a visor located at the ceiling, the remote control unit being mounted at the ceiling of the vehicle and near the visor, the remote control unit comprising:

an electric circuit;

a transmitter connected to the circuit;

an antenna connected to the transmitter;

at least one switch means located on the ceiling of the vehicle and connected to the circuit for activating the circuit and the transmitter to transmit a signal via the antenna to the automatic device;

a housing at the vehicle ceiling, the at least one switch means being located at the housing, wherein a visor support bracket is mounted on the ceiling and the housing has an opening for receiving the visor support bracket.

2. The remote control unit of claim 1, further comprising an indicator for indicating that the circuit and transmitter have been activated to transmit a signal.

3. The remote control unit of claim 1, further comprising a programmable device removably mounted in the remote control unit for controlling the automatic device.

4. The remote control unit of claim 1, wherein the circuit comprises a microprocessor for causing signals to be transmitted to individually control a plurality of automatic devices.

5. The remote control unit of claim 4, further comprising a plurality of the switch means each being connected to the circuit for selective control of the microprocessor.

6. The remote control unit of claim 1, wherein the visor support bracket engages the remote control unit through the opening formed in the housing to attach the remote control unit to the ceiling.

7. The remote control unit of claim 1, wherein the housing and the visor support bracket are integrally formed, the visor support bracket being attached to the ceiling to attach the remote control unit to the ceiling.

8. The remote control unit of claim 1, wherein the circuit and the transmitter are located within the housing.

9. The remote control unit of claim 1, further comprising at least one electrical contact connected to the circuit and located within at least one of the housing and the visor support bracket so as to engage at least one electrical contact protruding from the ceiling to electrically connect the remote control unit to an electric supply circuit disposed in the vehicle.

10. A combination including a remote control unit for use in a vehicle for controlling an automatic device outside the vehicle, a vehicle ceiling and a visor, the remote control unit being mounted at the ceiling of the vehicle and near the visor, the remote control unit comprising:

an electric circuit;

a transmitter connected to the circuit;

an antenna connected to the transmitter;

at least one switch means connected to the circuit for activating the circuit and the transmitter to transmit a signal via the antenna to the automatic device; wherein the visor is mounted at the vehicle ceiling to swing down to a use position and up to a non-use position at the vehicle ceiling, and wherein a recess is located in the ceiling and behind the visor, the remote control unit being received within the recess for enabling the visor to be moved to a non-use position at the ceiling without interference from the remote control unit; wherein the remote control unit is hidden from view when the visor is in the non-use position.

11. The combination of claim 10, wherein the recess is located in the ceiling so that the remote control unit is flush with a surface of the ceiling.

12. The combination of claim 10, further comprising means swingably attaching the visor to the ceiling to enable the visor to rotate between a non-use position and an operative position, the remote control unit being located so as to be received in the recess when the visor is in the non-use position.

13. The combination of claim 10, a recess in the ceiling, the remote control unit being received within the recess for enabling the sun visor to be moved to a non-use position at the ceiling without interference from the remote control unit, the visor being shaped to define a recess located in the visor on the side toward the ceiling when the visor is upraised to its non-use position for enabling the sun visor to be moved to a non-use position at the ceiling without interference from the remote control unit.

14. A remote control unit for use in a vehicle for controlling an automatic device outside the vehicle, the vehicle having a ceiling and having a visor located at the ceiling, the remote control unit being mounted at the ceiling of the vehicle and near the visor, the remote control unit comprising:

an electric circuit;

a transmitter connected to the circuit;

an antenna connected to the transmitter;

at least one switch means located on the ceiling of the vehicle and connected to the circuit for activating the circuit and transmitter to transmit a signal via the antenna to the automatic device; wherein the circuit and the transmitter are located in a housing at the vehicle ceiling, and the housing being formed to have a shape that substantially corresponds to the shape of a portion of the periphery of the visor and being disposed outside the periphery of the visor and wherein the housing and said at least one switch means are mounted adjacent to the periphery of the visor when the visor is in a non-use position.

15. A remote control unit for use in a vehicle for controlling an automatic device outside the vehicle, the vehicle having a ceiling and having a visor located at the ceiling, the remote control unit being mounted at the ceiling of the vehicle and near the visor, the remote control unit comprising:

an electric circuit;

a transmitter connected to the circuit;

an antenna connected to the transmitter; and at least one switch means located on the ceiling of the vehicle and connected to the circuit for activating the circuit and the transmitter to transmit a signal via the antenna to the automatic device; wherein the housing comprises a substantially L-shaped member shaped and located so as to surround a portion of the periphery of the visor.

16. The remote control unit of claim 13, further comprising a visor support bracket mounted on the ceiling and the housing having an opening formed therein for receiving the visor support bracket.

17. The remote control unit of claim 16, wherein the visor support bracket is secured to the ceiling and engages the remote control unit through the opening formed in the housing to attach the remote control unit to the ceiling.

18. The remote control unit of claim 15, wherein the housing includes an integrally formed visor support bracket, the visor support bracket being attached to the ceiling to attach the remote control unit to the ceiling.

* * * * *